United States Patent Office 3,292,994
Patented Dec. 20, 1966

3,292,994
CONTROLLED PARTICLE SIZE BaTiO₃
Klara Kiss, University Heights, and Jules Magder, Cleveland, Ohio, assignors to Horizons Incorporated, Cleveland, Ohio, a corporation of New Jersey
No Drawing. Filed May 7, 1963, Ser. No. 278,746
10 Claims. (Cl. 23—51)

This invention relates to barium titanate having a fine particle size and to techniques for producing the same.

References to barium titanate particles as fine as 150 Angstrom units in size have appeared in the literature, but the products therein described are believed to be substantially different from those obtained in the procedure of the present invention. For example Anliker et al. in Helv. Phys. Acta 25, 474 and 475 (1952) and 27,100 (1954) describe the preparation of such material by milling and as a result the resulting particles are fractured pieces of larger crystals and possess conchoidally shaped exteriors bearing no relationship to the actual crystal structure. In addition the sizes of the particles cover a broad range and are not readily controllable in a milling operation. Furthermore the very process of milling almost inevitably results in the introduction of a considerable amount of extraneous contamination in the product.

The preparation of crystalline barium titanate by the addition of a dilute alcoholic solution of a titanium ester such as tetrapropyl titanate to an equeous solution of a soluble barium salt, at a pH between 11 and 14 has been reported by S. S. Flaschen in the Journal of the American Chemical Society, December 5, 1955, vol. 77 on page 6194. By practicing the procedure described by Flaschen, a white fine grained barium titanate having a particle size between 1 and 5 microns is readily obtained. Prior to the present invention it has not been found possible to prepare crystalline barium titanate of the particle sizes of the fragments obtained by Anliker and his associates by the techniques discussed above.

The present invention is directed to a procedure for obtaining well crystallized uncontaminated particles of BaTiO₃ of a relatively uniform and readily controlled size range.

Specifically, the present invention is directed to a modification of the aforesaid Flaschen process whereby the particle size of the barium titanate precipitate is significantly finer than that obtainable by the Flaschen process, and whereby it is further possible to produce particle sizes within precisely defined limits. As a result, it then becomes possible to produce ferroelectrics having greatly improved properties as compared with those produced when utilizing the barium titanate materials heretofore available.

Briefly the present invention consists in modifying the Flaschen procedure by initially adding gross amounts of a water-soluble oxygen-functional organic compounds including alcohols and ethers, particularly cyclic ethers, to the aqueous solution of a water-soluble barium salt, to provide a substantial initial concentration of the additive prior to the addition of the alcoholic solution of titanium ester.

Following completion of the precipitation of the barium titanate particles in the desired size range, it is desirable to remove the precipitate from, or otherwise modify, the reaction medium as soon as possible, so that peptization and consequent particle growth are prevented. For example, rapid filtration of the reaction mixture, followed by rapid drying to constant weight at temperatures below 150° C., constitutes one means whereby growth of the precipitated particles is effectively stopped. Drying is preferably performed at 60° C. in vacuo, and the total time for recovery of the precipitate in dry form from the reaction medium is preferably not longer than two hours.

Another means of arresting particle growth, after the precipitation of the barium titanate particles is completed, comprises the addition of further gross amounts of water-soluble or water-miscible oxygen-functional organic solvents, such as isopropanol, acetone, dioxane, or tetrahydrofuran, prior to recovery of the precipitate in dried form. The amount of such a solvent added is preferably a quantity sufficient to increase the total volume of the reaction mixture by at least 50 percent. When such a solvent is used, recovery of the precipitate need not be accomplished immediately, but the reaction mixture may be stored for at least several days, if desired, prior to drying and filtration of the precipitate, without fear of engendering peptization and particle growth of the precipitate.

The invention will be better understood by reference to Table I comparing the results obtained by practicing the procedure described by Flaschen, i.e. with no such addition and the results obtained by modifying the Flaschen procedure, i.e. with the addition of the indicated amount of isopropyl alcohol prior to the addition of the titanium ester.

TABLE I

| Titanium Ester | Percent added [1] | Particle Size, Angstroms | Av. Particle Size |
|---|---|---|---|
| Isopropyl titanate | none | 2,000–3,000 | 2,500 |
| Do | 20 | below 500 | 400 |
| Triethanolamine chelate of tetraisopropyl titanate | none | 2,000–10,000 | 3,000 |
| Do | 20 | 200–800 | 400 |
| Do | 50 | 100–200 | 120 |

[1] Percent by weight isopropanol added before Ti ester.

The tabulated data clearly demonstrate that a direct relationship exists between the particle size and the initial concentration of the isopropyl alcohol added prior to the titanium ester. Therefore, the particle size can be controlled in a predictable manner by selecting the proper initial concentration of the alcohol or other water-soluble oxygen-functional organic additive.

Although the physical-chemical effect of the additive is not perfectly understood, it appears that the properties of the electrical diffuse layers surrounding the micelle containing the hydrolyzing Ti compound play a fundamental part in determining the dispersity and the specific surface of the particles obtained. The characteristics of these diffuse layers is determined by the nature and the concentration of the additive. Higher solvation of the micelles corresponds to finer particle sizes.

Micelles solvated to a high degree becomes water repellent due to the orientation of the alcohol molecules with the polar OH groups toward the micelle and their hydrocarbon component toward the liquid phase. The higher the concentration of the additive capable of solvation of the micelles the sooner the water repellent layer above is formed, and correspondingly smaller particles will be obtained. At least 20 volume percent of additive appears to be required in order to produce any noticeable results. A useful maximum appears to be about 75 volume percent based on the original volume present.

Instead of isopropyl alcohol as the water-soluble oxygen-functional organic additive, other lower alcohols including methanol and ethanol are also useful or cyclic ethers such as dioxane or tetrahydrofuran may be used as the means for controlling the particle size and diminishing the spread of sizes of particles initially in the precipitate. This addition may of course be supplemented by addition of similar oxygen-functional organic solvents promptly upon completion of the precipitation step, for the purpose of halting grain growth and/or peptization of the barium titanate particles as described above.

Other water soluble barium compounds may be used instead of barium hydroxide and other alkalies may be used to maintain the desired pH in the solution, without departing from the intended scope of this invention which is not to be limited except as may be required by the appended claims.

We claim:

1. In a process for producing particles of barium titanate finer than about 800 Angstrom units as a precipitate when an alcoholic solution of a titanium ester is added to an aqueous alkaline solution of a water soluble barium salt, the improvement which comprises adding an amount of a water-soluble oxygen-functional organic solvent selected from the group consisting of alcohols, ketones and cyclic ethers to the aqueous solution prior to the addition of the alcoholic solution of a titanium ester, said amount comprising between about 20% and 75% by volume of the initial solution of the water-soluble barium salt and recovering said precipitated particles from the remaining liquid present.

2. The process of claim 1 wherein the added solvent is methanol.

3. The process of claim 1 wherein the added solvent is ethanol.

4. The process of claim 1 wherein the added solvent is isopropanol.

5. The process of claim 1 wherein the aqueous alkaline solution is a solution of barium hydroxide, the ester is an isopropyl titanate ester, and the oxygen-functional water-soluble, water-miscible compound is isopropanol.

6. In a process for producing particles of barium titanate finer than about 800 Angstrom units as a precipitate in a reaction mixture formed by adding an alcoholic solution of a titanium ester to an aqueous alkaline solution of a water-soluble barium salt, the improvements which comprises (1) adding an amount of a water-soluble oxygen-functional organic solvent selected from the group consisting of alcohols, ketones and cyclic ethers to the aqueous solution prior to the addition of the alcoholic solution of a titanium ester whereby the particles which are precipitated possess the desired fineness, the amount being at least about 20% by volume of the aqueous alkaline solution; and (2) after said precipitation is complete, adding an additional amount of a water-soluble oxygen-functional organic solvent selected from the group consisting of alcohols, ketones and cyclic ethers to the precipitate containing solution previously formed, whereby grain growth and peptization of the finely divided particles of barium titanate are essentially arrested, and thereafter separately recovering the fine particles of $BaTiO_3$.

7. The process of claim 6 wherein the added solvent is methanol.

8. The process of claim 6 wherein the added solvent is ethanol.

9. The process of claim 6 wherein the added solvent is isopropanol.

10. The process of claim 6 wherein the amount of water-soluble oxygen-functional organic compound added before precipitation is at least about 20% by volume of the initial aqueous alkaline solution of the water-soluble barium salt and the amount of water-soluble oxygen-functional organic compound added after precipitation is an amount sufficient to increase the total volume of the reaction mixture by about at least 50%.

References Cited by the Examiner

UNITED STATES PATENTS

| 2,405,712 | 8/1946 | Russell | 260—632 |
| 2,948,628 | 8/1960 | Wainer | 23—51 X |
| 3,065,049 | 11/1962 | Bundy | 23—51 |

OTHER REFERENCES

Flaschen, Journal of the American Chemical Society, vol. 77, Dec. 5, 1954, p. 6194.

OSCAR R. VERTIZ, *Primary Examiner.*

H. T. CARTER, *Assistant Examiner.*